US008738710B1

(12) United States Patent
Du et al.

(10) Patent No.: US 8,738,710 B1
(45) Date of Patent: May 27, 2014

(54) SYSTEMS AND METHODS OF PROVIDING PUSH-TO-APPLICATION SERVICES

(75) Inventors: Hung Kien Du, Fairfax, VA (US); Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 658 days.

(21) Appl. No.: 12/535,743

(22) Filed: Aug. 5, 2009

(51) Int. Cl.
  *G06F 15/16* (2006.01)
(52) U.S. Cl.
  USPC ............ 709/206; 709/227; 709/228; 709/248
(58) Field of Classification Search
  USPC ................................ 709/206, 227, 228, 248
  See application file for complete search history.

(56) References Cited

U.S. PATENT DOCUMENTS

| | | | |
|---|---|---|---|
| 6,449,739 B1 * | 9/2002 | Landan | 714/47.2 |
| 7,061,928 B2 * | 6/2006 | Giroti et al. | 370/422 |
| 7,899,040 B2 * | 3/2011 | Andreasen | 370/356 |
| 7,912,041 B2 * | 3/2011 | Song et al. | 370/352 |
| 7,912,963 B2 * | 3/2011 | Jackson | 709/227 |
| 8,019,820 B2 * | 9/2011 | Son et al. | 709/206 |
| 2004/0224710 A1 * | 11/2004 | Koskelainen et al. | 455/518 |
| 2007/0004517 A1 * | 1/2007 | Mahajan | 463/42 |
| 2008/0162637 A1 * | 7/2008 | Adamczyk et al. | 709/204 |
| 2009/0149158 A1 * | 6/2009 | Goldfarb et al. | 455/414.1 |

* cited by examiner

*Primary Examiner* — Rupal Dharia
*Assistant Examiner* — Van Kim T Nguyen

(57) ABSTRACT

Systems and methods of providing push-to-application services are provided. A network includes a push-to-application session controller that manages a push-to-application session between an application and a client. The network also includes a media controller, coupled to the session controller, that transfers media between the client and the application. The network further includes an application synchronizer, coupled to the session controller, that controls synchronization between media provided by the media controller to the client and data provided by the application to the client.

17 Claims, 4 Drawing Sheets

SYSTEMS AND METHODS OF PROVIDING PUSH-TO-APPLICATION SERVICES

CROSS REFERENCE TO RELATED APPLICATIONS

This application is related to U.S. patent application Ser. No. 12/209,525, filed on Sep. 12, 2008, entitled "Systems and Methods of Push-to-Applications", the entire disclosure of which is herein expressly incorporated by reference.

BACKGROUND OF THE INVENTION

Wireless communication networks provide one or more communication services to mobile stations. These communication services can include voice interconnect calls, voice push-to-talk calls and non-voice data services. Voice interconnect calls are full-duplex calls and are the type commonly provided in wireless communication networks. Push-to-talk (PTT) voice calls are half-duplex calls and historically have only been provided on a limited number of wireless communication networks, such as the iDEN® network owned and operated by Sprint Nextel Corporation.

SUMMARY OF THE INVENTION

Recent developments have expanded the use of push-to-talk call beyond the iDEN network. These developments include the Push-to-Talk over Cellular (PoC) standard, as well as the QChat® system developed by Qualcomm, Inc. Nevertheless, these systems, like the iDEN® network, focus the use of push-to-talk technology for voice calls.

Systems and methods of providing push-to-application services are provided. An exemplary system includes a push-to-application session controller that manages a push-to-application session between an application and a client; a media controller, coupled to the session controller, that transfers media between the client and the application; and an application synchronizer, coupled to the session controller, that controls synchronization between media provided by the media controller to the client and data provided by the application to the client.

An exemplary method involves receiving, by a push-to-application session controller from a client, a request for a particular push-to-application service; receiving, by the push-to-application session controller from the client, a request for information for the particular push-to-application service; obtaining, by the push-to-application session controller from the particular push-to-application service, the requested information; and providing, by the push-to-application session controller, the requested information to the client.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
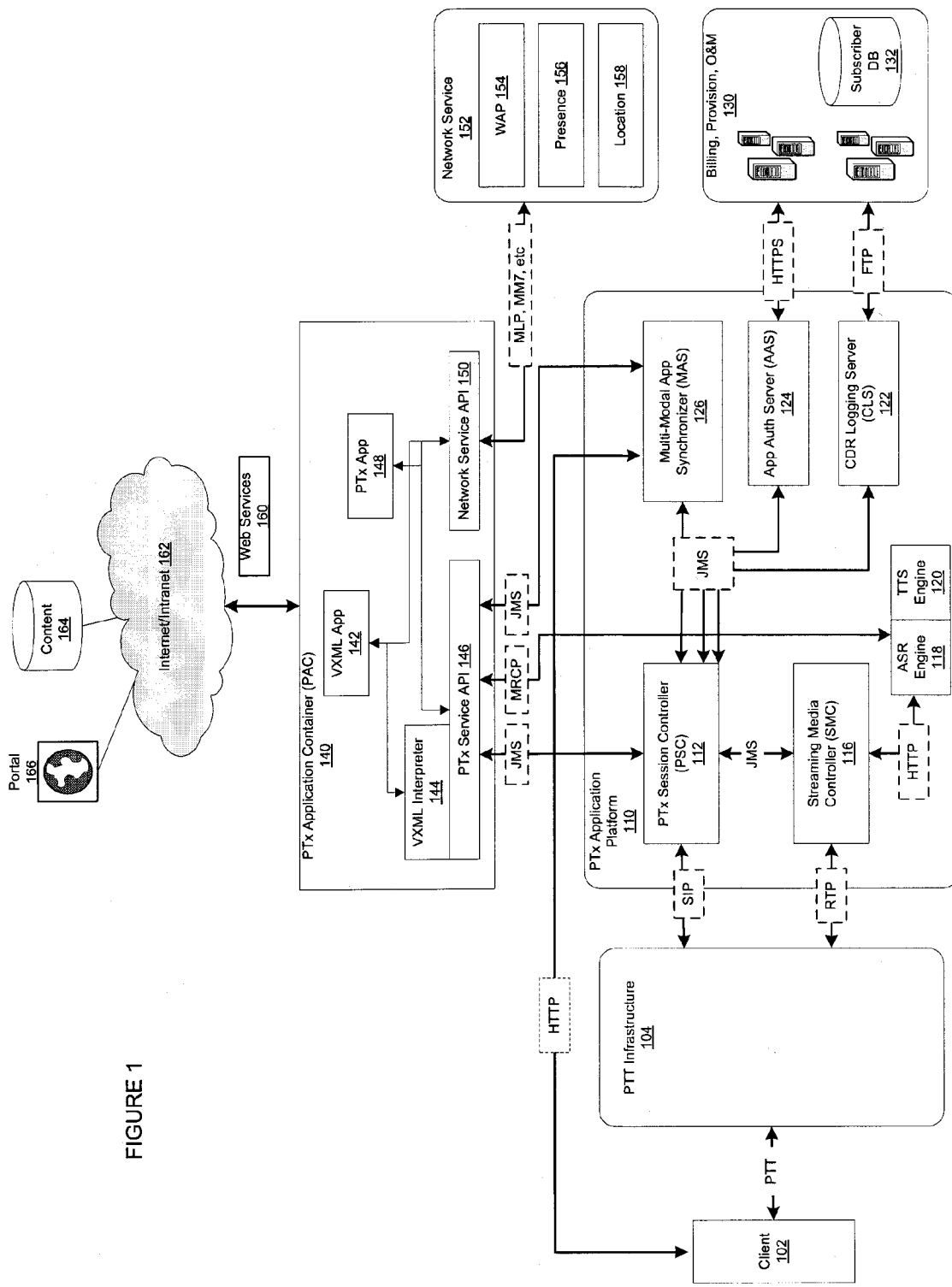
FIG. 1 is a block diagram illustrating an exemplary system in accordance with the present invention.

FIG. 1 is a block diagram illustrating an exemplary system in accordance with the present invention. The system allows Push-to-x (PTx) client 102 to invoke Push-to-x (PTx) applications, such as those described in the aforementioned U.S. patent application Ser. No. 12/209,525, such PTx applications are herein expressly incorporated by reference. These applications can be mobile station-to-mobile station and/or mobile station-to-server PTx. Exemplary applications include, but are not limited to, push-to-contact, push-to-text, push-to-office, push-to-announce, push-to-email, push-to-emotion, push-to-web, push-to-text chatroom, push-to-pull data, push-to-locate, push-to-find, push-to-bet, push-to-translate, push-to-game, push-to-payment, push-to-content, push-to-horoscope, push-to-vote, push-to-weather, push to info (e.g. traffic, news), push to social network (e.g. Myspace), push to sports (e.g. NASCAR, NFL) and/or the like. Two common features of these applications are that they are initiated by actuation of a PTT button on the client (i.e., a push and release), where the PTT button is used for requesting a floor of a PTT voice call, and that the applications employ a PTT infrastructure, which provides a fast setup time (typically under 1 second).

PTx Client 102 can be any type of client capable of communicating with a push-to-talk (PTT) communication infrastructure 104. This infrastructure can be any type of PTT infrastructure, including, but not limited to infrastructure compliant with the Push-to-Talk over Cellular (PoC) standard, QChat® protocols or iDEN® protocols. PTT infrastructure 104 can include one or more gateways (not illustrated) to couple client 102 via a particular type of PTT network to PTx application platform 110. These gateways convert the specific protocols used by the particular PTT network into common protocols used by PTx application platform 110. In the embodiment illustrated in FIG. 1, PTx application platform 110 uses session initiation protocol (SIP) for signaling and real-time protocol (RTP) for media.

PTx application platform 110 includes a PTx session controller (PSC) 112 coupled to streaming media controller (SMC) 116, multi-modal application synchronizer 126, application authentication and authorization server (AAS) 124 and customer data records (CDR) logging server (CLS) 122. PTx application platform 110 also includes an automatic speech recognition engine (ASR) 118 and a text-to-speech engine 120, both of which are coupled to streaming media controller 116 and PTx application container (PAC) 140.

PTx session controller 112 is coupled to PTT infrastructure 104, which communicate with each other using SIP. PTx session controller 112 maintains real-time media session with the PTx client 102 on behalf of the PTx application container 140. PTx session controller 112 also selects the streaming media controller to handle the particular screening of media (if more than one streaming media controller is deployed), notifies the PTx application container 140 of call-related events, and authenticates incoming service requests from client 140. PTx session controller 112 communicates with elements 116, 122, 124, and 126 using, for example, Java message service (JMS).

Streaming media controller 116 communicates with PTT infrastructure 104 using real-time protocol, and with automatic speech recognition engine 118 and text-to-speech engine 120 using HTTP. Streaming media controller 116 handles streaming media on behalf of PTx applications, and can transfer audio clips to the automatic speech recognition engine 118 for speech recognition and retrieve audio clips from the text-to-speech engine 120 for playback to PTx client 102.

Multi-modal application synchronizer 126 is coupled to PTx client 102. These elements communicate using HTTP. Although multi-modal application synchronizer 126 and PTx client 102 are illustrated as communicating outside of PTT infrastructure 104, these elements can communicate through the PTT infrastructure using, for example, SIP. It should be recognized that using HTTP and a direct path to PTx client 102 is more efficient than transporting this information through the PTT infrastructure. Synchronizer 126 is also coupled to PTx service application programming interface (API) 146 of PTx application container 140. Elements 126 and 146 communicate with each other using Java message service. Multi-modal application synchronizer 126 maintains the data session with the client 102 on behalf of applications executed on PTx application container 140 and manages the synchronization between the data and streaming media sessions with PTx client 102.

Automatic speech recognition engine 118 performs speech recognition of audio received from PTx client 102 and/or from an application executed on PTx application container 140. Text-to-speech engine 120 performs text-to-speech conversion for text received from PTx client 102 and/or an application executed on PTx application container 140. Text-to-speech engine 120 can maintain a cache of audio clips that correspond to the text that is converted into speech. Automatic speech recognition engine 118 and text-to-speech engine 120 are coupled to PTx service API 146 of PTx application container 140, all of which communicate using media resource control protocol (MRCP).

Application authentication and authorization server 124 authenticates service requests from applications executed on PTx application container 140 and communicates with a billing, provisioning, and operation and maintenance system 130 using HTTPS. Customer data record logging server 122 generates call detail records and forwards them to billing, provisioning, operation and maintenance system 130 using FTP. Billing, provisioning, and operation and maintenance system 130 includes a subscriber database 132 that includes user identity, authentication information and call detail records.

PTx application container 140 manages PTx instances of PTx applications executed on the container, notifies PTx session controller 112 of call events via PTx service API 146 using JMS. PTx application container 140 also receives and sends call requests to the PTx session controller 112 and receives and sends data to multi-modal application synchronizer 126 via PTx service API 146 on behalf of applications executed on PTx application container 140. PTx application container 140 is also coupled to web services 160 via an internet and/or intranet 162 to content 164 and/or portal 166 to pull web service content for the PTx applications.

PTx application container 140 can include any type of PTx application that provides push-to-application services, including a voice XML (VXML) application 142 and/or non-VXML PTx application 148. VXML application 142 communicates with PTx service API 146 via VXML interpreter 144. PTx application 148 communicates directly with PTx service API 146. Applications 142 and 148 can communicate with network services 152 using network service API 150. This communication can employ any type of protocol, including, but not limited to, mobile location protocol (MLP), MM7 and/or the like. Those skilled in the art will recognize that MM7 is a 3GPP interface, based on SOAP protocol, for sending MMS messages from 3rd party providers. Network services 152 include, for example, wireless application protocol (WAP) 154, presence services 156 and/or location services 158. Although FIG. 1 illustrates PTx application container 140 as including one VXML application 142 and one PTx application 148, the present invention is not so limited. Instead, PTx application container 140 can include one or more of either type of application. These applications can be deployed by an operator of the PTT network or provided by third parties.

Figure 2:
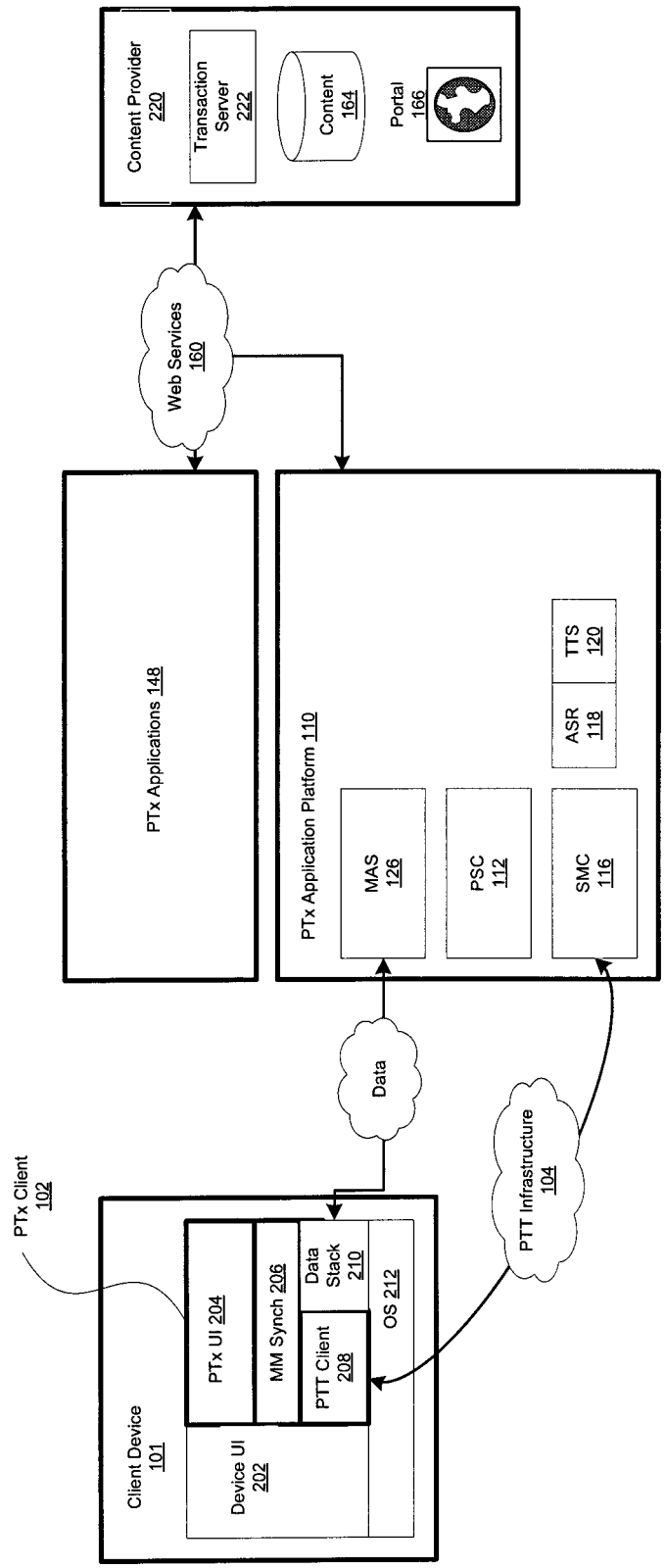
FIG. 2 is a block diagram illustrating the logical paths for voice and data between the client and network in accordance with exemplary embodiments of the present invention.

FIG. 2 is another block diagram illustrating the exemplary detailed system in accordance with the present invention. In particular, FIG. 2 illustrates the manner in which elements of PTx client 102 are coupled to PTx application platform 110. As illustrated in FIG. 2, PTx device 101 includes PTx client 102, includes a device user interface (UI) 202, data stack 210 and operating, system (OS) 212. As illustrated by the darkened lines surrounding elements 204-208, PTx client 102 includes a PTx UI 204, a multi-modal synchronizer 206 and PTT client 208. PTT client 208 communicates with streaming media controller 116 via PTT infrastructure 104, and data stack 210 communicates with multi-modal application synchronizer 126 via a data network. PTx application platform 110 and PTx applications 148 are coupled via web services 160 to one or more content providers 220. The content providers can include a transaction server 222, a content storage 164 and/or portal 166. As illustrated in FIG. 2, PTT client 208 and data stack 210 are independent processes, and multi-modal application server 126 synchronizes the input/output of real-time data from the PTT infrastructure and text data from the PTx application platform 110.

Figure 3:
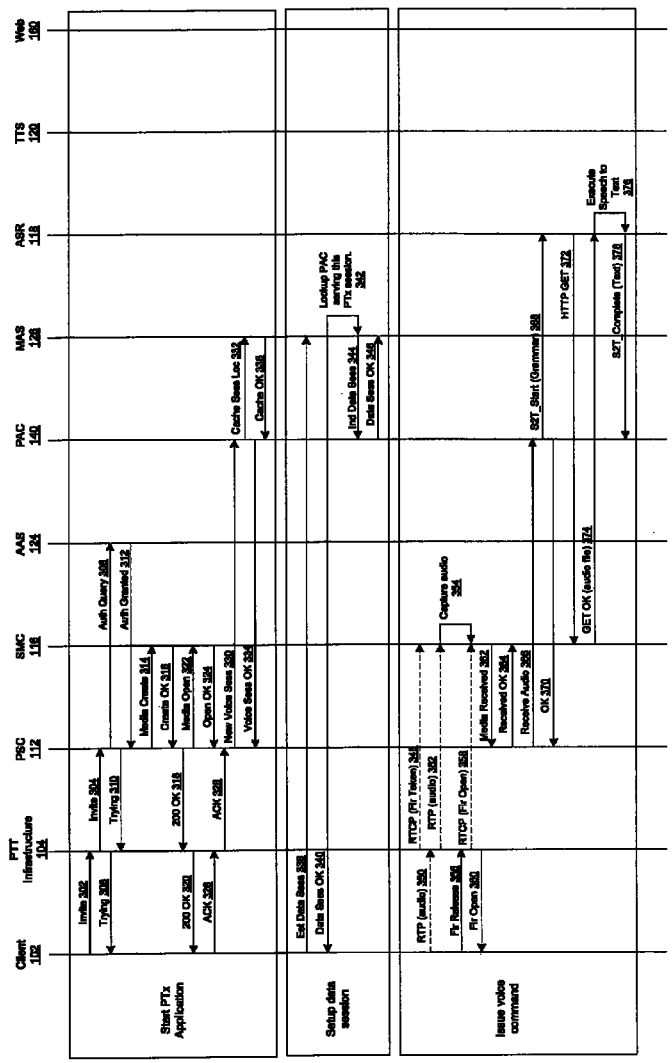
FIGS. 3 and 4 are call flow diagrams illustrating an exemplary method in accordance with the present invention.
Figure 4:
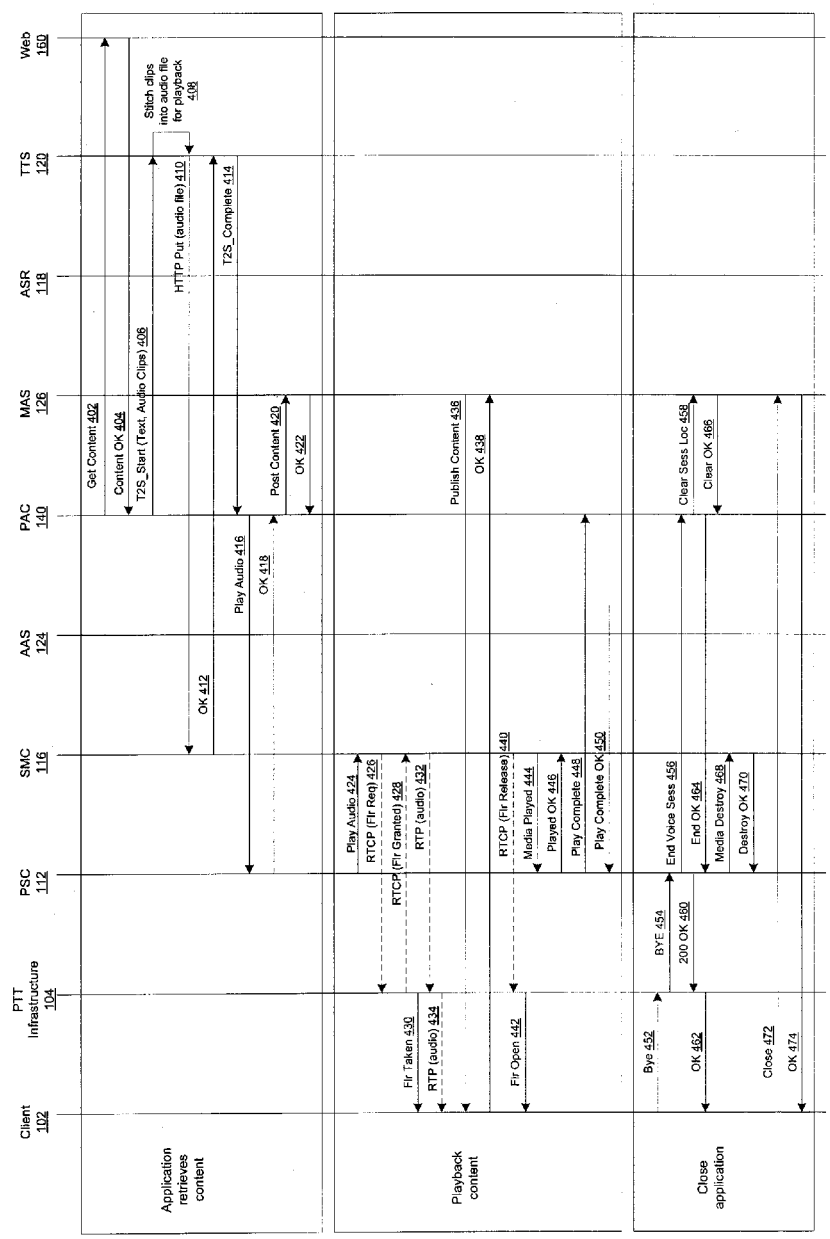

FIGS. 3 and 4 are call flow diagrams illustrating an exemplary method in accordance with the present invention. Generally, this method involves a PTx client making a PTx call and issuing a voice command to a PTx application, the application obtaining information and then providing the information to the client. Thus, this call flow can be employed for any of the exemplary PTx application discussed above. For ease of explanation the call flow diagrams assume that errors do not occur. If, however, errors do occur, these can be addressed based on the particular error within the system constraints.

Initially, PTx client 102 sends an Invite message to PTT infrastructure 104 (step 302), which forwards the Invite message to PTx session controller 112 (step 304). PTT infrastructure 104 also sends a Trying message to client 102 (step 306). PTx session controller 112 sends an Authorization Query message to application authentication server 124 (step 308), which replies with an Authorization Granted message (step 312). PTx session controller 112 sends a Trying message to PTT infrastructure 104 after sending the Authorization Query (step 310).

In response to the Authorization granted message, PTx session controller 112 sends a Media Create message to streaming media controller 116 (step 314), which replies with a Create OK message (step 316). PTx session controller 112 then sends a 200 OK message to PTT infrastructure 104 (step 318), which then forwards the message to PTx client 102 (step 320). PTx Client 102 responds with an ACK message (step 326), which is then forwarded to PTT session controller 112 (step 328). While the 200 OK and ACK messages are being exchanged, PTx session controller 112 sends a Media Open message to streaming media controller 116 (step 322), which replies with an Open OK message (step 324).

In response to receipt of the ACK message from PTT infrastructure 104 (step 328) and the Open OK message from streaming media controller 116 (step 324), PTx session controller 112 sends a new voice session message to PTx application container 140 (step 330), which then sends a Cache Session Location message to multi-modal application synchronizer 126 (step 332). PTx application container 140 also sends a Voice Session OK message (step 334) in response to the new voice session message. Multi-modal application synchronizer 126 sends a Cache OK message in response to the cache session location message (step 336). Thus, an instance of the PTx application has been initiated for PTx client 102, and the next stage is to set up the data session.

Exemplary embodiments of the present invention can be employed with devices that can support simultaneous voice and data sessions (e.g., 3G-enabled devices) and devices that can only support a voice or data session at any particular time. In this latter case, a data session will not be setup and processing will proceed to the issue voice command stage. For devices that support simultaneous voice and data sessions, the voice and data sessions can be setup in parallel or serially. Accordingly, although FIG. 3 is described below as setting up the data session first and then the voice session, the present invention can be employed such that the sessions are setup in parallel. Setting up the voice and data session in parallel will reduce the overall latency of the process. Additionally, if the voice and data sessions are setup serially, the voice sessions can be setup first and then the data session can be setup.

Initiation of setting up the data session starts with PTx client 102 sending an Establish Data Session message to multi-modal application synchronizer 126 (step 338), which replies with a Data Session OK message (step 340). Multi-modal application synchronizer 126 looks up the particular PTx application container serving this particular PTx session (step 342), and sends an Individual Data Session message to the identified PTx application container (step 344), which replies with a Data Session OK message (step 346). The multi-modal application synchronizer can lookup the particular PTx application container using an internal database or a domain name server (DNS) query based on the PTX client identification (ID). The lookup is also performed to determine where a particular application is located. Step 342 assumes that the system employs more than one PTx application container, e.g., one container for the network operator's applications and one or more different containers for third party applications. When, however, the system includes only one PTx application container, this step can be omitted. The Data Session OK message completes establishment of the data session between client 102 and the particular PTx application.

Now that the data session has been set up PTx client 102 can issue voice commands. Because the present invention involves a PTT system, which operate using a shared floor, after the data session is setup PTT infrastructure 104 sends an RTCP (Floor Taken) message to streaming media controller 116 (step 348), to seize the floor of the PTT session. When PTx client 102 desires to issue a voice command, the PTT button on PTx device 101 is depressed and the microphone of device 101 captures the audio until the PTT button is released. Specifically, the voice command is sent in an RTP message to PTT infrastructure 104 (step 350), which forwards the message to streaming media controller 116 (step 352). Streaming media controller 116 captures the audio (step 354). When the client has finished providing audio, a Floor Release message is sent to the PTT infrastructure 104 (step 356), which then sends an RTCP (Floor Open) message to streaming media controller 116 (step 358). This causes the streaming media controller to cease capturing the audio. In response to receiving the Floor Release message, PTT infrastructure 104 sends a Floor Open message to PTx client 102 (step 360).

After streaming media controller 116 has finished capturing the audio the controller sends a Media Received message to PTx session controller 112 to confirm receipt of the voice command (step 362), and PTx session controller 112 replies with a Received OK message (364). PTx session controller 112 then sends a Receive Audio message to PTx application container 140 (step 366), which then sends an S2T_Start (Grammar) message to automatic speech recognition engine 118 (step 368). PTx application container 140 responds to the PTx session controller 112 with an OK message (step 370). Automatic speech recognition engine 118 then sends a HTTP GET message to streaming media controller 116 (step 372), which replies with a GET OK (audio file) message (step 374). Automatic speech recognition engine 118 performs speech-to-text conversion (step 376), and then sends an S2T_Complete (Text) message (step 378). This completes the inbound processing of the issued voice command.

Once the inbound voice command has been processed, the content requested by the voice command is retrieved. Specifically, turning now to FIG. 4, PTx application container 140 sends a Get Content message to web services 160 (step 402), which responds with a Content OK message (step 404). PTx application container 140 then sends a T2S_Start (Text, Audio Clips) message to text-to-speech converter 120 (step 406), which stitches the audio clips into an audio file for playback (step 408) and sends a HTTP Put (audio file) message to streaming media controller 116 (step 410). Streaming media controller 116 then sends an OK message to text-to-speech converter 120 (step 412). Text-to-speech converter 120 sends a T2S_Complete message to PTx application container 140 (step 414), which then sends a Play Audio message to PTx session controller 112 (step 416). PTx session controller 112 then responds with a OK message (step 418), and PTx application container 140 then sends a Post Content message to multi-modal application synchronizer 126 (step 420). Multi-modal application synchronizer 126 responds with an OK message (step 422), which completes the retrieval of the content by the PTx application. PTx application container 140 can store the retrieved content for a configurable amount of time so that subsequent requests for the information can be obtained from a local storage or cache instead of having to retrieve the information again from the web services 160. The local storage can reduce latency for subsequent requests for the information.

Next the content is played back to the PTx client 102, which is initiated by PTx session controller 112 sending a Play Audio message to streaming media controller 116 (step 424). Streaming media controller 116 then sends a RTCP (Floor Request) message to PTT infrastructure 104 (step 426) in order to seize the floor of the PTT session. PTT infrastructure 104 sends a RTCP (Floor Granted) message to streaming media controller 116 (step 428) and a Floor Taken message to PTx client 102 (step 430). Streaming media controller 116 then sends a RTP (audio) message to PTT infrastructure 104 (step 432), which forwards the audio to PTx client 102 (step 434). Multi-modal application synchronizer 126 then sends a Publish Content message to PTx client 102 (step 436), which replies with an OK message (step 438). After reproduction of the audio has completed, streaming media controller 116 sends a RTCP (Floor Release) message to PTT infrastructure 104 (step 440), which forwards the message to PTx client 102 (step 442). Streaming media controller 116 then sends a Media Played message to PTx session controller 112 (step 444), which responds with a Played OK message (step 446). PTx session controller 112 then sends a Play Complete message to PTx application container 140 (step 448), which replies with a Play Complete OK message (step 450). This completes the playback of the content.

After the content has been played the application should be closed, which is initiated by PTx client 102 sending a Bye message to PTT infrastructure 104 (step 452), which sends a BYE message to PTx session controller 112 (step 454). PTx session controller 112 responds with a 200 OK message (step 460), and PTT infrastructure forwards the message to PTx client 102 (step 462). In response to the BYE message (step 454), PTx session controller 112 sends an End Voice Session message to PTx application container 140 (step 456), which then sends a Clear Session Location message to multi-modal application server 126 (step 458). PTx application container 140 also sends an End OK message to PTx session controller 112 (step 464). In response to the Clear Session Location message (step 458), multi-modal application server 126 sends a Clear OK message (step 466). In response to receiving the End OK message (step 464), PTx session controller 112 sends a Media Destroy Message to streaming media controller 116 (step 468), which responds with a Destroy OK message (step 470). PTx client 102 sends a Close message to multi-modal application server (step 472), which replies with an OK message (step 474). This closes the application and completes the PTx session.

Although the call flow diagrams of FIGS. 3 and 4 include messages designated with particular names, the present invention can employ similar messages with other names. Furthermore, the present invention can also send a data command instead of a voice command. In this case there would be no need to convert audio into text, and instead the text would be sent from PTx session controller to PTx application container without conversion. If desired, however, the text can be converted from a format of PTx client 102 into a format used by the particular PTx application. Additionally, or alternatively, the present invention can send data to PTx client 102 instead of audio. In this case there would be no need to convert the data into audio, and instead the text would be sent from PTx session controller 112 to PTx client 102 without conversion. If desired, however, the data can be converted from a format of the PTx application into a format for PTx client 102 (e.g., formatted for the display of PTx client 102). Additionally, although the call flow diagram discusses providing the requested information in audio form, the requested information can be provided picture, video, formatted text, or a combination of picture, video and formatted text. Moreover, data and audio can be sent to PTx client 102, which can then synchronize the reproduction of the data and audio via the PTT user interface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system that provides push-to-application services, the system comprising:
a push-to-application session controller, in communication with a client via a push-to-talk infrastructure, that manages a push-to-application session between an application and the client, wherein the push-to-application session controller communicates with the push-to-talk infrastructure using a session initiation protocol and the push-to-talk infrastructure communicates with the client using a push-to-talk communication protocol;
a media controller, coupled to the session controller and in communication with the client via the push-to-talk infrastructure, that transfers media between the client and the application, wherein the media controller communicates with the push-to-talk infrastructure using a real time protocol for media;
an application synchronizer, coupled to the session controller, and in communication with the client without the involvement of the push-to-talk infrastructure, to maintain a data session with the client and to transport synchronization information to the client to synchronize media provided by the media controller to the client and data provided by the application to the client, wherein the application synchronizer communicates with the session controller using a Java message service and the application synchronizer communicates with the client using a hypertext transfer protocol; and
an application container that includes the application, the application container coupling the application to the session controller and the application synchronizer via a first set of application programming interfaces (APIs).

2. The system of claim 1, further comprising:
a speech recognition component that receives speech from the client, converts the speech into text and provides the text to the application.

3. The system of claim 2, further comprising:
a text-to-speech converter that receives text from the application, converts the text into speech and provides the speech to the client.

4. The system of claim 1, wherein the data is a picture, video, formatted text, or a combination of picture, video and formatted text.

5. The system of claim 1, wherein the application container couples the application to network services via a second set of APIs.

6. The system of claim 5, wherein the second set of APIs for network services include wireless application protocol (WAP) services, presence services or location services.

7. The system of claim 1, wherein the application is a voice extensible markup language (VXML) application.

8. The system of claim 7, wherein VXML application is coupled to the first set of APIs via a VXML interpreter.

9. The system of claim 1, wherein the application container includes a plurality of applications.

10. The system of claim 1, wherein the application container is coupled to content and a portal via a network for data retrieval and the application container includes storage for the content.

11. The system of claim 1, wherein the push-to-application session controller, media controller and application synchronizer are located in a network that is distinct from a network in which the client is located.

12. A method of providing push-to-application services, the method comprising:
receiving, by a push-to-application session controller from a client, a request for a particular push-to-application service included in an application container, wherein the push-to-application session controller is in communication with the client via a push-to-talk infrastructure, wherein the push-to-application session controller and the push-to-talk infrastructure communicate using a session initiation protocol, the push-to-talk infrastructure communicates with the client using a push-to-talk communication protocol, the application container couples the application to the push-to-application session controller by a first set of application programming interfaces (APIs), and the application container and the push-to-application session controller communicate using a Java message service;

establishing, by an application synchronizer, a data session between the client and the particular push-to-application service included in the application container, wherein the application synchronizer and the application container communicate using a Java message service via the first set of APIs, and wherein the application synchronizer communicates with the client without the involvement of the push-to-talk infrastructure using a hypertext transfer protocol to maintain the data session with the client and to transport synchronization information to the client;

establishing, by the push-to-application session controller, an audio session between the client and the particular push-to-application service via a media controller, wherein the push-to-application session controller and the media controller communicate using a Java message service;

receiving, by the media controller from the client, a request for information for the particular push-to-application service;

obtaining, by the push-to-application session controller from the particular push-to-application service, the requested information; and providing, by the push-to-application session controller, the requested information to the client by the data session and the audio session in parallel, wherein the audio session and the data session are synchronized by the application synchronizer.

13. The method of claim 12, wherein the request for information is in an audio form, the method further comprising:

sending the request for information to an automatic speech recognition engine; and receiving text corresponding to the information in audio form.

14. The method of claim 12, wherein the requested is in a text form, the method further comprising:

sending the requested information to a text-to-speech conversion engine; and receiving audio corresponding to the requested information in text form.

15. The method of claim 12, wherein the requested information is provided as a picture, video, formatted text, or a combination of picture, video and formatted text.

16. The method of claim 15, wherein when the request information includes a combination of picture, video or formatted text, the requested information is output in a synchronized manner.

17. The method of claim 12, further comprising:

receiving, by the particular application, the request for information; and obtaining the requested information from the internet or local storage.

* * * * *